United States Patent [19]
Felser et al.

[11] Patent Number: 6,064,386
[45] Date of Patent: May 16, 2000

[54] SHAPE OBJECTS HAVING AUTHORABLE BEHAVIORS AND APPEARANCES

[75] Inventors: Lawrence David Felser; David Wayne Arsenault, both of Ithaca, N.Y.

[73] Assignee: Autodesk, Inc., San Rafael, Calif.

[21] Appl. No.: 09/092,383

[22] Filed: Jun. 5, 1998

Related U.S. Application Data

[63] Continuation-in-part of application No. 09/088,116, Jun. 1, 1998.

[51] Int. Cl.$^7$ .......................................... G06F 3/00
[52] U.S. Cl. ............................ 345/355; 345/964; 345/435
[58] Field of Search ..................... 345/355, 964, 345/339, 333, 334, 439, 441, 435; 364/468.03, 468.04

[56] References Cited

U.S. PATENT DOCUMENTS

| | | | |
|---|---|---|---|
| 5,490,241 | 2/1996 | Mallgren et al. | 395/140 |
| 5,513,309 | 4/1996 | Meier et al. | 345/339 |
| 5,627,949 | 5/1997 | Letcher, Jr. | 345/420 |
| 5,633,955 | 5/1997 | Bozinovic et al. | 382/187 |
| 5,704,028 | 12/1997 | Schanel et al. | 395/140 |
| 5,818,457 | 10/1998 | Murata et al. | 345/435 |
| 5,856,828 | 1/1999 | Letcher, Jr. | 345/420 |

OTHER PUBLICATIONS

Townsend et al., "Microsoft Office 6-in-1", 1994, Que Corporation, see p. 713.

*Primary Examiner*—Raymond J. Bayerl
*Assistant Examiner*—David E. Brown
*Attorney, Agent, or Firm*—Gates & Cooper

[57] ABSTRACT

An intelligent shape is displayed in conjunction with a CAD application program, wherein the intelligent shape can be authored by a user. The intelligent shape comprises a frame and at least one property which defines the shape. The intelligent shape comprises several objects for use in connecting, manipulating, displaying, mapping, and otherwise creating a new component or modifying an existing one. The intelligent shape also monitors the user's interaction with the CAD application program during execution of the sequence of steps, wherein handlers defined for the shape provide additional customization of the component shape during system operations.

42 Claims, 3 Drawing Sheets

SHAPE OBJECTS HAVING AUTHORABLE BEHAVIORS AND APPEARANCES

CROSS REFERENCE TO RELATED APPLICATIONS

This application is a continuation-in-part of the following co-pending and commonly assigned patent application:

U.S. patent application Ser. No. 09/088,116, entitled "POSITIONING AND ALIGNMENT AIDS FOR SHAPE OBJECTS WITH AUTHORABLE BEHAVIORS AND APPEARANCES," by Lawrence D. Felser, et al., Attorney Docket No. 30566.38US01, filed on Jun. 1, 1998; which is incorporated by reference herein.

BACKGROUND OF THE INVENTION

1. Field of the Invention

The present invention relates generally to graphical user interfaces, and in particular, to a method, apparatus, and article of manufacture for providing shape objects with authorable behaviors and appearances for computer programs having a graphical user interface.

2. Description of the Related Art

The use of Computer Assisted Drafting (CAD) application programs is well known in the art. Some CAD programs provide templates and palettes that help users create documents, graphical presentations, etc. However, these templates and palettes provide only limited assistance and do little to help the user connect standard CAD components, define new components, or define methods of manipulating the components within the CAD program.

Most standard components are predefined by the CAD program itself, leaving little room for the user to define custom shapes without using the predefined standard components as building blocks. A user must manipulate standard components to define a shape or outline, place them spatially proximate on a working screen, and then group them together using a grouping or wrapping function.

This multiple step approach of dragging components onto the screen and then modifying the components to create a new shape or outline within a document is inefficient and time consuming. Further, the process is not easily learned by a user, and makes it difficult to create shapes that are shared between users. Further, these limitations prevent many users from utilizing the CAD program to its fullest extent.

Consequently, there is a need in the art for improved techniques for creating components in a CAD program, in order to create documents faster. Further, there is a need in the art for improved techniques for creating components in a CAD program that eliminate the need for accessing toolbar or menu functions.

SUMMARY OF THE INVENTION

To address the requirements described above, the present invention discloses a method, apparatus, and article of manufacture for executing intelligent shape programming in a computer within a CAD application program, wherein the intelligent shape can be authored by a user. The intelligent shape comprises several objects for use in connecting, manipulating, displaying, mapping, and otherwise creating a new component or modifying an existing one. The intelligent shape programming also monitors the user's interaction with the CAD application program during execution of the sequence of steps, wherein handlers defined for the shape provide additional customization of the component during system operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a computer-assisted drafting (CAD) program that provides intelligent shape objects, wherein the intelligent shape objects can be authored by a user. The intelligent shape comprises several objects for use in connecting, manipulating, displaying, mapping, and otherwise creating a new component or modifying an existing one. The intelligent shape programming also monitors the user's interaction with the CAD application program during execution of the sequence of steps, wherein handlers defined for the shape provide additional customization of the component during system operations.

Hardware Environment

Figure 1:
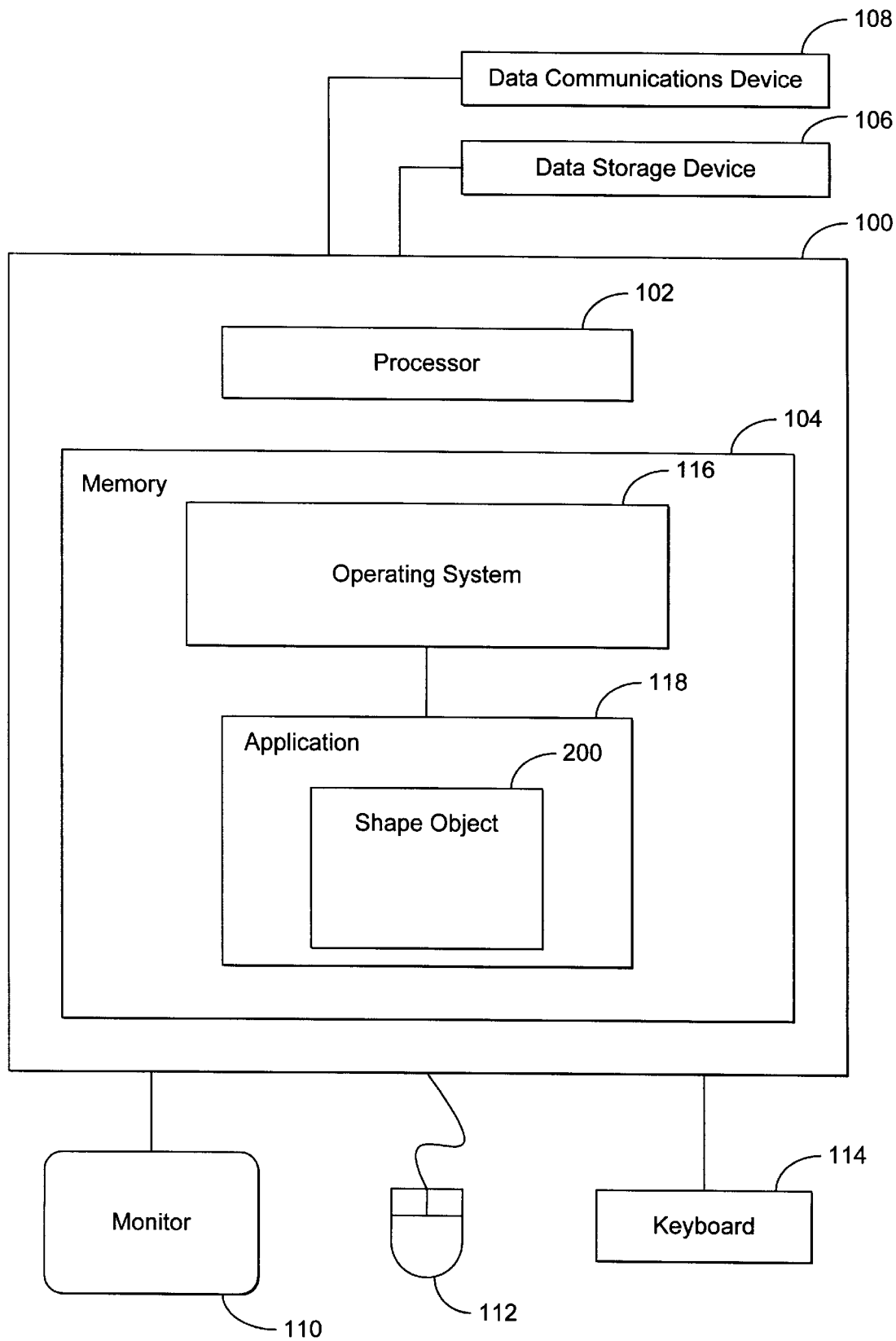
FIG. 1 is an exemplary hardware environment used to implement the preferred embodiment of the invention.

FIG. 1 is an exemplary hardware environment used to implement the preferred embodiment of the invention. The present invention is typically implemented using a personal computer 100, which generally includes, inter alia, a processor 102, random access memory (RAM) 104, data storage devices 106 (e.g., hard, floppy, and/or CD-ROM disk drives, etc.), data communications devices 108 (e.g., modems, network interfaces, etc.), monitor 110 (e.g., CRT, LCD display, etc.), mouse pointing device 112 and keyboard 114. It is envisioned that attached to the personal computer 100 may be other devices such as read only memory (ROM), a video card, bus interface, printers, etc. Those skilled in the art will recognize that any combination of the above components, or any number of different components, peripherals, and other devices, may be used with the computer 100.

The personal computer 100 usually operates under the control of an operating system 116. The present invention is usually implemented in one or more application programs 118 that operate under the control of the operating system 116. The application program 118 is usually a CAD program or other graphics program. In the preferred embodiment, the application program 118 provides one or more intelligent shape objects 200.

Generally, the application program 118 and intelligent shape objects 200 comprise instructions and/or data that are embodied in or retrievable from a computer-readable device, medium, or carrier, e.g., the data storage device 106, a remote device coupled to the computer 100 via the data communications device 108, etc. Moreover, these instructions and/or data, when read, executed, and/or interpreted by the computer 100 cause the computer 100 to perform the steps necessary to implement and/or use the present invention.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that any combination of the above components, or any number of different components, including computer programs, peripherals, and other devices, may be used to implement the present invention, so long as similar functions are performed thereby.

Intelligent Shape Objects

Figure 2:
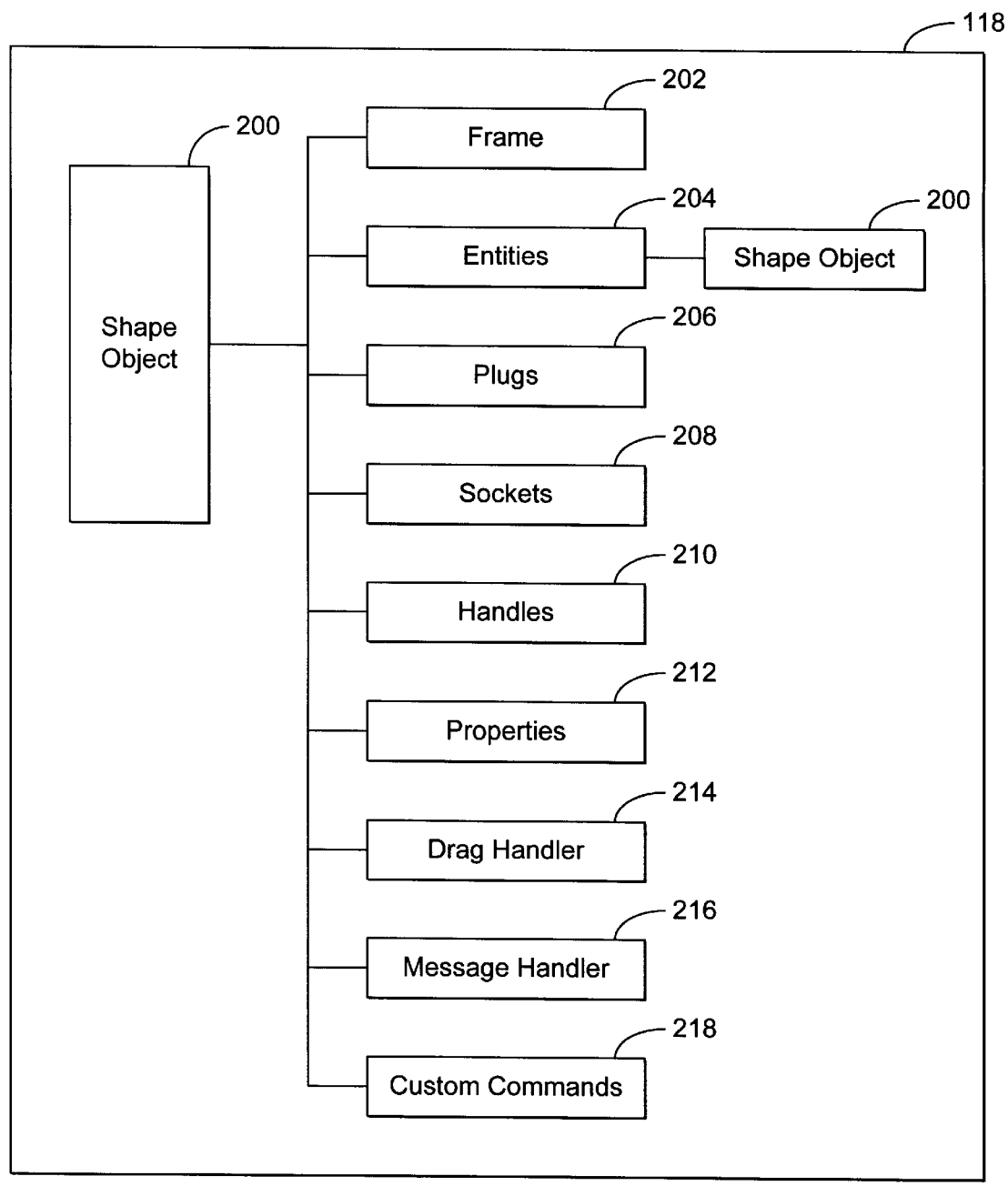
FIG. 2 illustrates the components of a shape object of the present invention.

FIG. 2 is a block diagram that illustrates the components of an intelligent shape object 200 according to the present invention. The intelligent shape object 200 is comprised of a number of different elements: (1) a spatial frame 202 that provides the underlying structure and spatial mapping for the intelligent shape object 200; (2) an entities collection 204 that includes zero or more objects of geometry along with zero or more other (subordinate) shape objects 200 that together make up the (superordinate) shape object 200; (3) zero or more plugs 206 and sockets 208 that provide connectivity to other shape objects 200; (4) zero or more handles 210 that provide direct manipulation of the shape object 200, thereby allowing the user to stretch or otherwise resize the shape object 200; (5) a properties collection 212 that contains additional authorable properties of the shape object 200, e.g., extended properties defined by authors of the shape object 200; (6) a drag handler 214 that defines the behavior of the shape object 200 while the shape object 200 is being dragged; (7) a message handler 216 that defines the behavior of the shape object 200 when the shape object 200 receives system level commands or inputs; and (8) a custom command collection 218 that allows the author to define extended commands for the shape object 200. The frame 202, the entities 204, the plugs 206, the sockets 208, the handles 210, the properties 212, the drag handler 214, the message handler 216, and the custom commands 218 may be imbued with data and logic that add intelligence to the shape object 200, in order to provide added convenience to the user.

The shape object 200 is authored (also called created) by specifying the values of the properties of the objects comprising the shape object 200. A property value can be an object, which gives shape objects 200 nesting capabilities. This aspect of adding new objects or replacing existing objects within a shape object 200 is part of the authoring process. Authoring is an activity that is external to the shape object 200; the shape object 200 source code, along with the source code for the objects within the shape object 200, are not affected by the authoring process. This bifurcation of the authoring activity from the shape object 200 allows the shape object to be authored statically or at runtime. The shape object 200 is then persistent until modified.

Shape objects 200 can be uniquely named, and can also generate events that reflect changes from the objects contained within shape object 200. External software can subscribe to these events, ensuring that the external software is notified of any changes to the shape object 200.

Example Shape Object

As an example, consider a shape object 200 that describes a chair. Such a shape object 200 has a geometry, which describes the paths used to render the appearance of the chair on a page. The shape object 200 may be composed of geometry that describes the chair's support members, with sub-shapes making up the seat, back, arms and other elements (and each of those shapes have their own properties, geometry, and so on). This geometry is defined as the frame 202 of the shape object 200.

The chair may be modular, taking optional wheels, arms, and levers, each of which connects to the shape object 200. These connection points are defined via plugs 206 and sockets 208. The chair may come in two or three sizes, any of which may be invoked by dragging handles. This chair may have a variety of properties such as materials, costs, names, and catalog numbers. And the chair resides within the document page with respect not only to the page itself but also with respect to the other furniture and shapes that may also be included on the page. The intelligence built into the chair's shape object 200, plugs 206, sockets 208, handles 210, and properties 212 provides the convenience of, for instance, adjusting cost with resizing, allowing or disallowing accessories (control levers, upholstery), enforcing consistent choices of seat, back, and arm designs, and whatever other relationships may be interdependent.

Frame

The frame 202 maps the spatial aspects of the elements of the shape object 200 to a particular space, notably the document page coordinate space. The frame 202 is a property of the shape object 200, and as such is under the control of the author of the shape object 200, e.g., the Visual Basic for Applications (VBA) programmer, and anyone else with access to the shape properties.

The frame 202 of a shape object 200 exposes a geometric framework to which the elements of the shape object 200 can be attached via expressions. The frame 202 also serves as a superstructure that relates all the other objects, some of which may be non-geometric, within the shape object 200. In addition, the frame 202 characterizes the spatial aspect of the shape object 200 as a whole, to allow the interpretation of methods such as Move, Rotate and Mirror. Finally, the frame 202 provides the mapping, if any, between the inside of the shape object 200 and the outside of the shape object 200.

The frame 202 is a description of a coordinate space that maps the local (inside the shape object 200) space to a parent (outside the shape object 200) space. For example, a straight line internal to a polar frame becomes an arc outside the frame. The frame 202 can encompass one, two, or three dimensional spaces.

Several types of frames 202 can be envisioned: line frames, rectangular frames, scaling rectangle frames, and polar frames.

A line frame 202 provides a frame 202 for a line shape object 200 that has a start point and an end point. The user can modify the start or end point and manipulate the start and end points of the line.

A rectangular frame 202 provides a frame for a shape object 200 that remains of constant scale, e.g., a chair that only comes in one size.

A scaling rectangle frame 202 provides a frame for a shape object 200 that expands and shrinks in size, e.g., a custom-built desktop should expand or shrink to fit a space exactly. However, a scaling rectangle frame 202 also encompasses frames that expand or shrink in increments, such as a cubicle wall, depending on what sizes are manufactured.

A polar frame 202 provides a frame for a shape object 200 that always expands or shrinks in both dimensions proportionally. Other types of frames are also possible with the present invention.

Entities Collection

The entities collection 204 stores a set of zero or more entities. A shape object 200 uses an entities collection 204 to define the geometry for rendering the shape object's 200 appearance. At least one entity 204 holds the geometry that makes up the shape object 200. The entities collection 204 is a standalone collection of objects to hold geometry for shapes and other objects. In addition, the entity 204 can hold other shape objects 200 to fully define the shape object 200. A complex shape object 200 may comprise several entities 204, each of which may store some geometry as well as particular related sub-shape objects 200.

Plugs and Sockets

The plugs 206 and sockets 208 enable geometric and logical connections between shape objects 200. Plugs 206 enable one side of the connection, and sockets 208 enable the other side. Plugs 206 and sockets 208 can be designed to accept any type of mating connectors, or specific types of connectors, much like electrical plugs and sockets 208 used in a home to distinguish between 110 VAC and 320 VAC connections. For example, a deluxe chair shape object 200 may contain sockets 208 that accept only deluxe plugs 206 to disallow mating less expensive seats, backs, and arms to the deluxe chair shape object 200.

Handles

The handles 210 are points located within the shape object 200 that are exposed to the user interface (UI) when the shape object 200 is selected. Handles 210 allow direct manipulation of geometry within the shape object 200, as well as any other shape object 200 parameter of collection element that can be referenced via expressions. Handles 210 have properties, such as x-y position, geometry, and define a relationship between mouse and handle position. With the handles 210 of the present invention, the shape author can constrain handles to particular range of motion as function of mouse movement. Typically, the handle 210 x and y coordinates are directly related to the mouse x and y coordinates. However, the handle 210 of the present invention allows the shape author to relate the handle x and y coordinates to any function, or a constant. For example, the shape author can equate the x coordinate of the handle 210 (handlex) to a constant, and the y coordinate of handle 210 (handley) to the y coordinate of mouse pointing device 112. This would create a handle 210 that moves only in the y direction regardless of the x position of the mouse pointing device 112. The shape author can use any expression, e.g., trigonometric functions, equations, or other functions to constrain handle properties. The handle 210 position is thus independent of mouse position, and the shape author relates the handle 210 position to the mouse pointing device 112 position by using an expression to achieve any desired handle 210 motion.

Properties

The properties 212 are other custom or extended properties defined by the shape object 200 author not contained within the frame 202, handles 210, plugs 206, and sockets 208. For example, custom properties 212 can be a manufacturer code (a string), a price (a currency value) or a coefficient of friction for a given material. Properties 212 can also be defined for intermediate or scratch values within a shape object 200.

The Drag Handler

The shape object 200 contains objects that handle messages and the behavior of the shape object 200. The shape object 200 contains an object that, for example, handles the shape object's 200 drag and drop behavior. This object is known as the drag handler 214. The drag handler 214 can be customized or initially authored by a user, which enables a user to change the actions performed by the shape object 200 upon entering the program as well as the shape object's 200 interactions with other shape objects 200.

The Message Handler

The shape object 200 also contains an object that handles messages passed down from the containing system. This object is called the message handler 216. The message handler 216, like the drag handler 214, can be customized or initially authored by a user, which enables a user to change the actions performed by the shape object 200 in response to keyboard, mouse, and other system events.

Custom Commands

In addition to the above, each shape object 200 has custom commands 218 that can be programmed by the user. These custom commands 218 are accessed by the user by using a context menu, typically accessed by using the right hand button on a mouse pointing device 112. For example, the chair shape object 200 described above may have a custom command 218 associated with it to include a solid back on the shape object 200, or a carved back, or a padded seat, etc., depending on the desires of the user.

Creating a Shape

Figure 3:
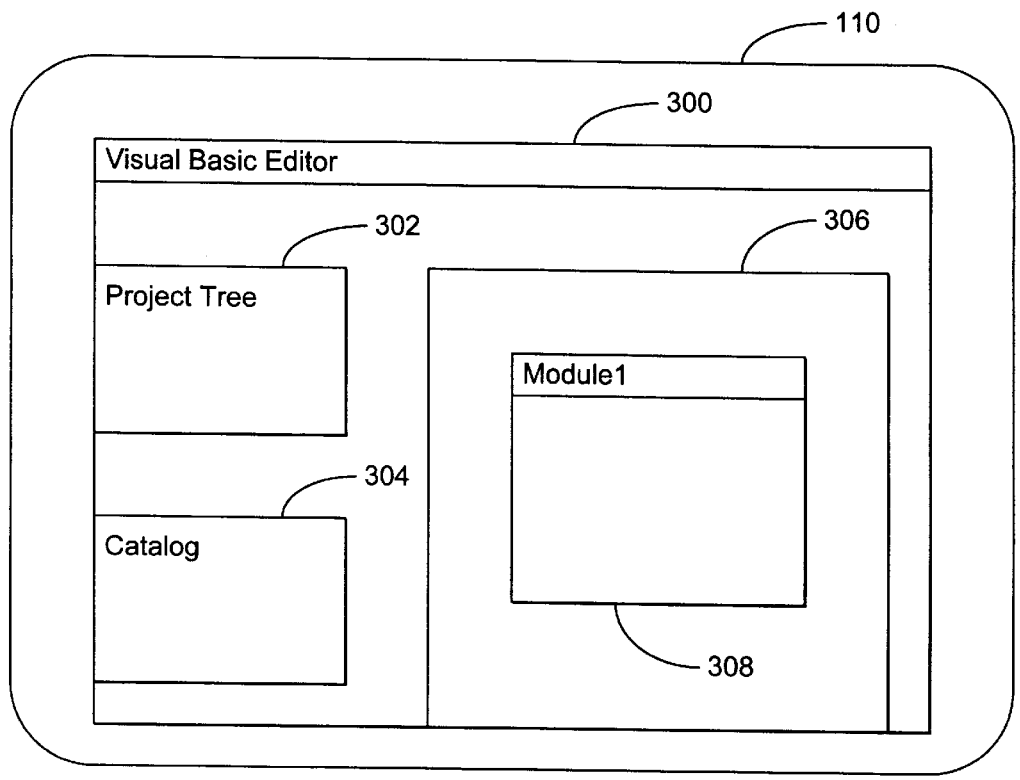
FIG. 3 illustrates how to create a shape object of the present invention.

FIG. 3 illustrates how to create a shape object of the present invention.

FIG. 3 illustrates the Visual Basic for Applications (VBA) editor window 300 where computer software code is written to define a shape object 200. The VBA editor window 300 contains other windows, such as the project tree window 302, the catalog window 304, and the working window 306. Once the editor function to create a shape object 200 has been invoked, module window 308 will appear in working window 306. Other methods for creating a shape object 200 are envisioned within the scope of the present invention.

The first step in creating a shape object 200 is to create the frame of the shape object 200. This frame comprises computer software code that performs several functions, e.g., mapping the spatial aspects of the shape object 200 to the document coordinate space (or any other space desired by the user), providing a framework to attach the other elements or objects associated with that shape object 200, relating the subordinate objects within the shape object 200 together, and characterizing the spatial aspects of the shape object 200 such that commands that are applied to the shape can be correctly interpreted.

Although there are several methods to create a frame 202, or a shape object 200, initially, a user or designer selects a frame as a basis for the remainder of the shape object.

As an example, to create a shape object 200 with a rectangular frame 202 of height 20 and width 25 with the lower left corner of the rectangular frame 202 at x=10, y=30, software code is written within the module window 308 as follows:

```
SubMain()
Dim RFrm As RectFrame
Set RFrm = New RectFrame
RFrm.Height = 20
RFrm.Width = 25
RFrm.X = 10
RFrm.Y = 30
Shp.Frame = RFrm
EndSub
```

Once the frame is created, a property (or multiple properties) of the shape object 200 is created by the shape author. These properties include the entities collection 204, the plugs 206 and sockets 208, the handles 210, the custom properties 212, the drag handler 214, the message handler 216, and the custom commands 218. The user adds definition to these properties, either in the form of mathematical expressions or constants, to create the property itself.

This is performed by creating the geometry of the shape, for example, a circle of radius 10, centered at x=40 and y=50, by writing software code to create a circle as an entity 204 as follows:

```
Dim Cir As Circle2D
Set Cir = Ent. AddCircle(40, 50, 10)
```

Additional properties or subordinate objects can be added to the shape object 200 as needed or desired by the user.

The user then couples the property to the frame 202 to allow the frame to use the defined property, by adding lines of code to window 308 to add the circle to the entities collection 204 as follows:

```
Dim Ent As DrawObjects
Set Ent = Doc.DrawObjects
```

The property can then be modified to display the desired information, e.g., by returning to window 308 and changing the properties, such as the radius of the circle, etc.

The use of software code to create a shape object 200 is preferred to using a pointing device 112 because software code provides more precision to the shape. Further, software allows a user to add more exotic properties to a shape, which would be difficult if not impossible to create using a pointing device 112.

Figure 4:
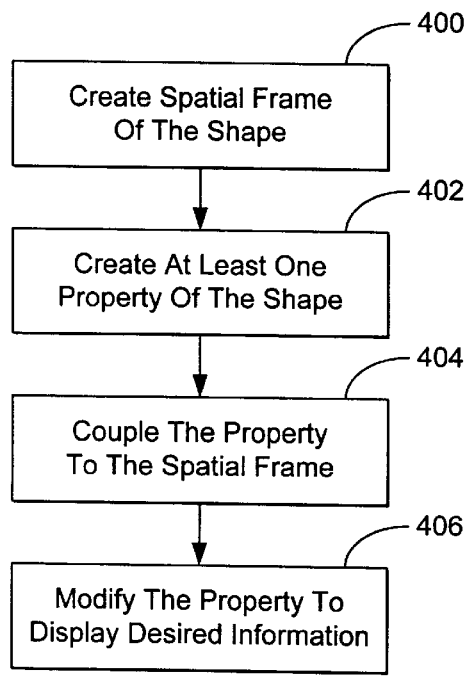
FIG. 4 is a flowchart that illustrates the general logic of performing the steps of the present invention.

FIG. 4 is a flowchart that illustrates the general logic of performing the steps of the present invention.

Block 400 represents performing the step of creating a spatial frame of the shape wherein the spatial frame provides a mapping function for the shape and provides a geometric framework for the shape.

Block 402 represents performing the step of creating at least one property of the shape.

Block 404 represents performing the step of coupling the property of the shape to the spatial frame of the shape, wherein the property couples to the geometric framework of the spatial frame.

Block 406 represents performing the step of modifying the property coupled to the spatial frame to display desired information on the monitor.

Conclusion

This concludes the description of the preferred embodiment of the invention. The following describes some alternative embodiments for accomplishing the present invention.

For example, any type of computer, such as a mainframe, minicomputer, workstation or personal computer, could be used with the present invention. In addition, any software program, application or operating system having a user interface could benefit from the present invention.

The above teaching also supports additional functions that may also be implemented using the intelligent shape objects of the present invention. In addition, the intelligent shapes can be integrated closely with each application program by any number of different methods.

In summary, the present invention discloses a method, apparatus, and article of manufacture for executing intelligent shape programming in a computer within a CAD application program, wherein the intelligent shape can be authored by a user. The intelligent shape comprises several objects for use in connecting, manipulating, displaying, mapping, and otherwise creating a new component or modifying an existing one. The intelligent shape programming also monitors the user's interaction with the CAD application program during execution of the sequence of steps, wherein handlers defined for the shape provide additional customization of the component during system operations.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of creating a shape for displaying information on a monitor attached to a computer, comprising the steps of:
    creating a spatial frame of the shape wherein the spatial frame provides a mapping function between an inside of the shape and an outside of the shape and provides a geometric framework for the shape;
    creating at least one property of the shape, wherein the property of the shape is selected from a group comprising entities, plugs, sockets, handles, custom properties, drag handlers, and message handlers wherein the plugs comprise a first side of a connection point for the shape, the first side of the connection point defining where the shape can attach to other shapes;
    coupling the property of the shape to the spatial frame of the shape, wherein the property couples to the geometric framework of the spatial frame; and
    modifying the property coupled to the spatial frame to display desired information on the monitor.

2. The method of claim 1, wherein the entities of the shape contain at least one additional shape.

3. The method of claim 1, wherein the step of coupling further comprises the step of automatically coupling the second object to the first object along a defined range of one or more of the attachment points.

4. The method of claim 1, further comprising the step of modifying the spatial frame to display desired information on the monitor.

5. The method of claim 1, wherein the entities comprise a geometrical construct for rendering the shape's appearance.

6. The method of claim 1, wherein the plugs further comprise a first side of a logical connection point for the shape.

7. The method of claim 1, wherein the plugs further comprise a first side of a geometrical connection point for the shape.

8. The method of claim 1, wherein the sockets comprise a second side of a connection point for the shape, the second side of the connection point defining where other shapes can attach to the shape.

9. The method of claim 8, wherein the sockets further comprise a second side of a logical connection point for the shape.

10. The method of claim 9, wherein the sockets further comprise a second side of a geometrical connection point for the shape.

11. The method of claim 1, wherein the handles comprise at least one point located within the shape, the point being exposed to a user interface when the shape is selected.

12. The method of claim 11, wherein the handles allow direct manipulation of geometry within the shape.

13. The method of claim 1, wherein the drag handler comprises at least one object that controls a behavior of the shape during a drag operation by a user.

14. The method of claim 1, wherein the message handler comprises at least one object that controls a behavior of the shape in response to a system event of the computer.

15. A computer-implemented apparatus for displaying information, comprising:
   a computer having a monitor attached thereto;
   means for creating a spatial frame of the shape wherein the spatial frame provides a mapping function between an inside of the shape and an outside of the shape and provides a geometric framework for the shape;
   means for creating at least one property of the shape, wherein the property of the shape is selected from a group comprising entities, plugs, sockets, handles, custom properties, drag handlers, and message handlers, and the plugs comprise a first side of a connection point for the shape, the first side of the connection point defining where the shape can attach to other shapes;
   means for coupling the property of the shape to the spatial frame of the shape, wherein the property couples to the geometric framework of the spatial frame; and
   means for modifying the property coupled to the spatial frame to display desired information on the monitor.

16. The computer-implemented apparatus of claim 15, wherein the entities of the shape contain at least one additional shape.

17. The computer-implemented apparatus of claim 16, wherein the means for coupling further comprises means for automatically coupling the second object to the first object along a defined range of one or more of the attachment points.

18. The computer-implemented apparatus of claim 15, further comprising means for modifying the spatial frame to display desired information on the monitor.

19. The computer-implemented apparatus of claim 15, wherein the entities comprise a geometrical construct for rendering the shape's appearance.

20. The computer-implemented apparatus of claim 15, wherein the plugs further comprise a first side of a logical connection point for the shape.

21. The computer-implemented apparatus of claim 15, wherein the plugs further comprise a first side of a geometrical connection point for the shape.

22. The computer-implemented apparatus of claim 15, wherein the sockets comprise a second side of a connection point for the shape, the second side of the connection point defining where other shapes can attach to the shape.

23. The computer-implemented apparatus of claim 22, wherein the sockets further comprise a second side of a logical connection point for the shape.

24. The computer-implemented apparatus of claim 22, wherein the sockets further comprise a second side of a geometrical connection point for the shape.

25. The computer-implemented apparatus of claim 15, wherein the handles comprise at least one point located within the shape, the point being exposed to a user interface when the shape is selected.

26. The computer-implemented apparatus of claim 25, wherein the handles allow direct manipulation of geometry within the shape.

27. The computer-implemented apparatus of claim 15, wherein the drag handler comprises at least one object that controls a behavior of the shape during a drag operation by a user.

28. The computer-implemented apparatus of claim 15, wherein the message handler comprises at least one object that controls a behavior of the shape in response to a system event of the computer.

29. An article of manufacture comprising a computer program carrier readable by a computer and embodying one or more instructions executable by the computer to perform method steps of displaying information on a monitor attached to the computer, the method comprising the steps of:
   creating a spatial frame of the shape wherein the spatial frame provides a mapping function between an inside of the shape and an outside of the shape and provides a geometric framework for the shape;
   creating at least one property of the shape, wherein the property of the shape is selected from a group comprising entities, plugs, sockets, handles, custom properties, drag handlers, and message handlers, and the plugs comprise a first side of a connection point for the shape, the first side of the connection point defining where the shape can attach to other shapes;
   coupling the property of the shape to the spatial frame of the shape, wherein the property couples to the geometric framework of the spatial frame; and
   modifying the property coupled to the spatial frame to display desired information on the monitor.

30. The article of manufacture of claim 29, wherein the entities of the shape contain at least one additional shape.

31. The article of manufacture of claim 29, wherein the step of coupling further comprises the step of automatically coupling the second object to the first object along a defined range of one or more of the attachment points.

32. The article of manufacture of claim 29, further comprising the step of modifying the spatial frame to display desired information on the monitor.

33. The article of manufacture of claim 29, wherein the entities comprise a geometrical construct for rendering the shape's appearance.

34. The article of manufacture of claim 29, wherein the plugs further comprise a first side of a logical connection point for the shape.

35. The article of manufacture of claim 29, wherein the plugs further comprise a first side of a geometrical connection point for the shape.

36. The article of manufacture of claim 29, wherein the sockets comprise a second side of a connection point for the shape, the second side of the connection point defining where other shapes can attach to the shape.

37. The article of manufacture of claim 36, wherein the sockets further comprise a second side of a logical connection point for the shape.

38. The article of manufacture of claim 36, wherein the sockets further comprise a second side of a geometrical connection point for the shape.

39. The article of manufacture of claim 29, wherein the handles comprise at least one point located within the shape, the point being exposed to a user interface when the shape is selected.

40. The article of manufacture of claim 29, wherein the handles allow direct manipulation of geometry within the shape.

41. The article of manufacture of claim 29, wherein the drag handler comprises at least one object that controls a behavior of the shape during a drag operation by a user.

42. The article of manufacture of claim 29, wherein the message handler comprises at least one object that controls a behavior of the shape in response to a system event of the computer.

* * * * *

UNITED STATES PATENT AND TRADEMARK OFFICE
CERTIFICATE OF CORRECTION

PATENT NO. : 6,064,386
DATED : May 16, 2000
INVENTOR(S) : Lawrence David Felser and David Wayne Arsenault It is certified that error appears in the above-identified patent and that said Letters Patent is hereby corrected as shown below:

Column 8,
Line 62, after "claim" change "9" to -- 8 --.

Column 9,
Line 30, after "claim" change "16" to -- 15 --.

Signed and Sealed this

Second Day of July, 2002

Attest:

Attesting Officer

JAMES E. ROGAN
Director of the United States Patent and Trademark Office